United States Patent [19]

Freeny, Jr.

[11] Patent Number: 5,694,162

[45] Date of Patent: Dec. 2, 1997

[54] METHOD FOR AUTOMATICALLY CHANGING BROADCAST PROGRAMS BASED ON AUDIENCE RESPONSE

[75] Inventor: Charles C. Freeny, Jr., Irving, Tex.

[73] Assignee: Automated Business Companies, Inc., Irving, Tex.

[21] Appl. No.: 509,215

[22] Filed: Jul. 31, 1995

Related U.S. Application Data

[63] Continuation-in-part of Ser. No. 448,932, May 24, 1995, abandoned, which is a continuation of Ser. No. 138,293, Oct. 15, 1993, abandoned.

[51] Int. Cl.⁶ .................................................. H04N 7/173
[52] U.S. Cl. ............................. 348/12; 348/13; 455/4.2; 455/5.1
[58] Field of Search ........................ 348/12, 13, 7, 348/6, 8; 455/3.1, 3.2, 4.1, 4.2, 5.1, 6.3; 395/200.09, 200.08; H04N 7/44, 7/14, 7/10, 7/173, 7/20, 7/22

[56] References Cited

U.S. PATENT DOCUMENTS

| | | | |
|---|---|---|---|
| 4,151,370 | 4/1979 | Root | 455/2 |
| 4,305,131 | 12/1981 | Best | 395/152 |
| 4,475,132 | 10/1984 | Rodesch | 358/342 |
| 5,036,389 | 7/1991 | Morales | 455/2 |
| 5,236,199 | 8/1993 | Thompson, Jr. | 273/439 |

FOREIGN PATENT DOCUMENTS

| | | |
|---|---|---|
| 2550624 | 5/1977 | Germany . |
| 2904981 | 8/1979 | Germany . |
| 0265872 | 11/1987 | Japan . |
| 2140963 | 12/1984 | United Kingdom . |
| 0013105 | 6/1994 | WIPO . |

*Primary Examiner*—David E. Harvey
*Attorney, Agent, or Firm*—Dunlap & Codding, P.C.

[57] ABSTRACT

A method for automatically changing programs broadcasted by a broadcast unit based on audience response. Responses from individuals comprising the audience are received and the program is automatically altered or changed based on such audience response. The altered or changed program then is broadcasted.

4 Claims, 4 Drawing Sheets

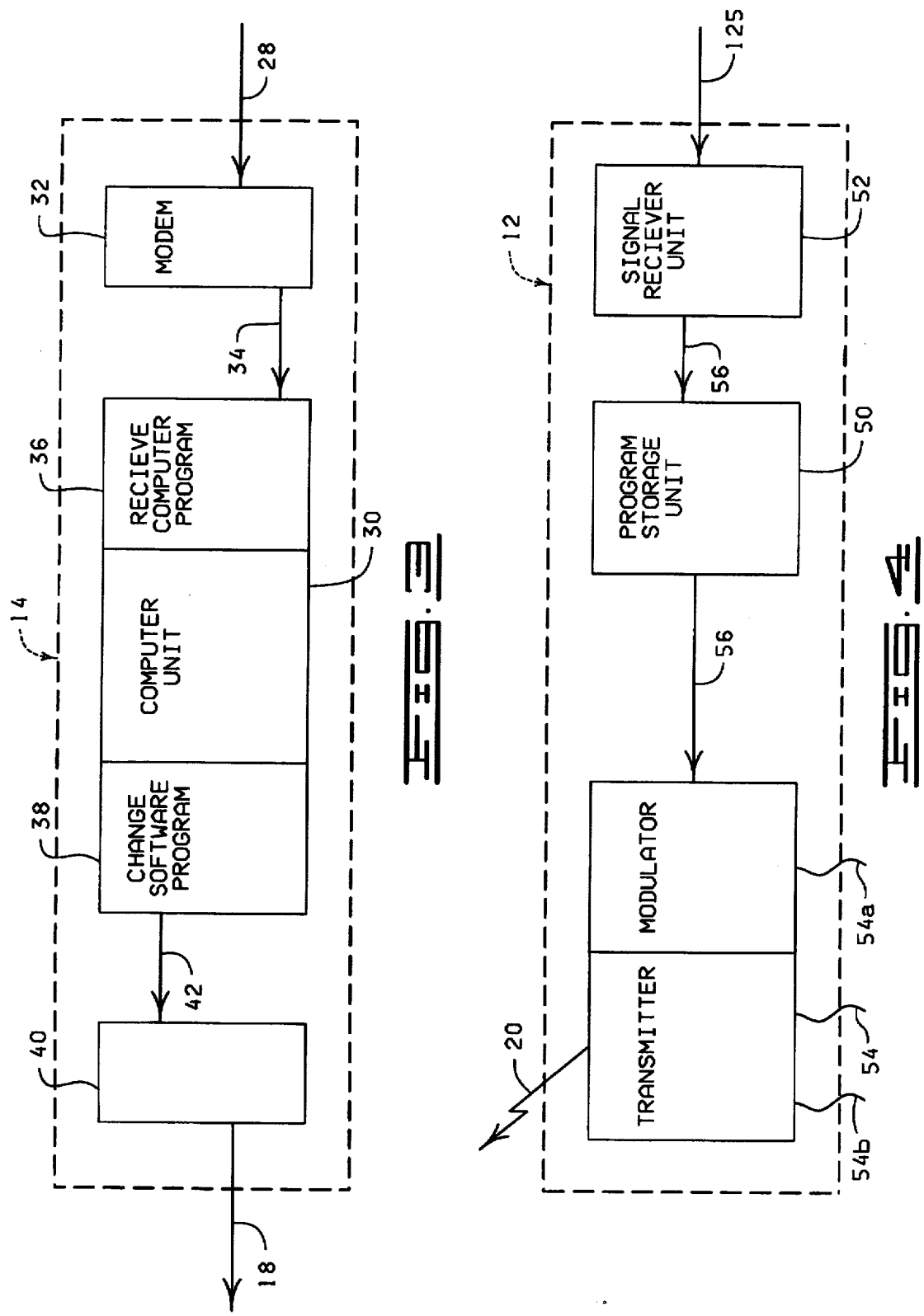

METHOD FOR AUTOMATICALLY CHANGING BROADCAST PROGRAMS BASED ON AUDIENCE RESPONSE

CROSS-REFERENCE TO RELATED APPLICATIONS

This application is a continuation-in-part of U.S. Ser. No. 08/448,932, filed May 24, 1995 now abandoned; which is a continuation of U.S. Ser. No. 08/138,293, filed Oct. 15, 1993, now abandoned.

FIELD OF THE INVENTION

The present invention relates generally to systems for broadcasting programs and, more particularly, but not by way of limitation, to a system for broadcasting programs where the program automatically is altered or changed based upon audience response.

BRIEF DESCRIPTION OF THE DRAWINGS

FIG. 3 is a schematic, diagrammatic view of the broadcast network control system portion of the automated broadcast program change system of FIG. 1.

FIG. 4 is a diagrammatic, schematic view of a broadcast network transmit system portion of the automated broadcast program change system of FIG. 1.

DESCRIPTION OF THE PREFERRED EMBODIMENTS

Figure 1:
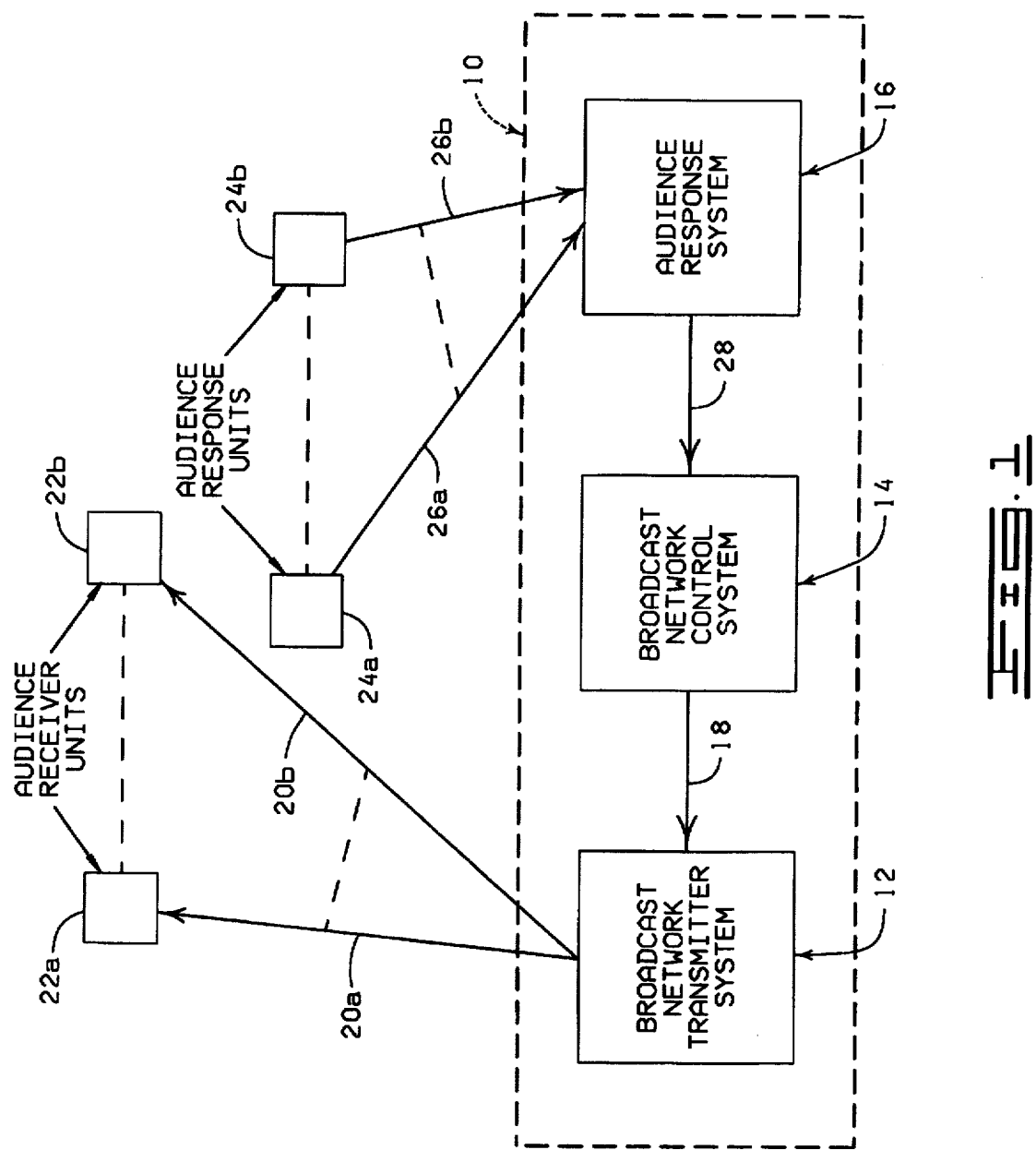
FIG. 1 is a diagrammatic, schematic view of an automated broadcast program change system constructed in accordance with the present invention.

Shown in FIG. 1 and designated by the general reference numeral 10 is an automated broadcast program change system constructed in accordance with the present invention. The automated broadcast program change system 10 basically comprises a broadcast network transmitter system 12, a broadcast network control system 14 and an audience response system 16.

The broadcast network transmitter system 12 is adapted to receive programs via a signal path 18 and transmit or broadcast such received programs over broadcast signal paths 20 with two broadcast signal paths 20 being diagrammatically represented in FIG. 1 and associated with the respective reference numerals 20a and 20b. The broadcast network transmitter system 12 may be adapted to transmit the program via cable or via air way transmission or any other suitable transmission link. Further, the programs may be audio or audio and video programs and the broadcast network transmitter system 12 is adapted to transmit such audio or audio and video signals via the broadcast signal paths 20a and 20b.

The program broadcast signals 20a and 20b are received by a plurality of audience receiver units 22. Only two audience receiver units are shown in FIG. 1 and designated therein with the specific reference numerals 22a and 22b. The audience receiver units may be conventional radios or television sets depending upon the type of signal broadcasted by the broadcast network transmitter system 12.

The audience receiver units 22 receive the programs broadcasted by the broadcast network transmitter system 12 and output such received programs in an audio or audio and visually perceivable form to be received by individuals near such audience receiver units 22 with such individuals being sometimes referred to herein as the "audience".

The present system also contemplates a plurality of audience response units 24. Only two audience response units are specifically shown in FIG. 1 and designated therein by the individual reference numerals 24a and 24b. In one embodiment, the audience response units 24 may comprise a conventional touch tone telephone or video wand unit to touch a computer screen, for example. In any event, the audience response units 24 are adapted to provide each member of the audience with a means for communicating with the automated broadcast program change system 10.

In response to hearing or hearing and seeing the program broadcasted by the broadcast network transmitter system 12, the audience responds to such broadcast using the audience response units 24 to output an audience response over signal paths 26. Only two signals paths 26 are shown in FIG. 1 and designated therein by the individual reference numerals 26a and 26b. The signal paths 26 may be conventional telephone lines, air way transmissions, cable transmissions, computer networks (Local Area Networks or Wide Area Networks) or any other suitable transmission link.

The audience response system 16 receives the audience responses transmitted via the signal paths 26. The audience response system 16 is adapted to output an audience response signal over a signal path 28 in response to the audience response signals received over the signal paths 26. The signal outputted by the audience response system 16 over the signal path 28 is indicative of a desired program change based upon the received audience responses.

The program change signal outputted by the audience response system 16 is inputted into the broadcast network control system 14. In response to receiving the broadcast change signal over the signal path 28, the broadcast network control system 14 alters or changes the program and outputs the changed or altered program over the signal path 18 for broadcasting via the broadcast network transmitter system 12.

In one embodiment, a plurality of predetermined programs are stored in the broadcast network control system 14. Each of these predetermined programs is related to a same program subject matter, but each of the predetermined programs is different from the other predetermined programs in a preselected manner. Initially, the broadcast control system 14 selects one of the predetermined programs to be a selected program and outputs that selected program over the signal path 18 for broadcast via the broadcast network transmitter system 12.

The selected program broadcasted via the broadcast network transmitter system 12 is received by the audience receiver units 22. The audience receiver units 22 output the selected programs in a manner to be perceived by individuals comprising the audience. The audience then uses the audience response units 24 to output or broadcast an audience response to the selected programs. The audience responses outputted by the audience response units 24 are received by the audience response system 16. The audience response system 16 analyzes the audience responses and outputs a program change signal over the signal path 28 indicating a predetermined program change in response to the received audience responses.

The broadcast network control system 14 receives the program change signal and selects automatically a different predetermined program based upon the audience response signal with this different predetermined program being designated as an audience response derived program. The audience response derived program then is outputted by the broadcast network control system 14 over the signal path 18 to be broadcasted by the broadcast network transmitter system 12.

The audience receives the audience response derived program via the audience receiver units 22. The audience then provides audience response via the audience response units 24 in response to the audience response derived program. The responses of the audience to the audience response derived program again are received by the audience response system 16 which analyzes such responses and outputs a different program change signal over the signal path 28. The broadcast network control system 14 then selects a different predetermined program designated as the selected program and outputs such selected program over the signal path 18 for broadcast via the broadcast network transmitter system 12.

This process is repeated for any one of a number of predetermined times. In short, the automated broadcast program change system 10 automatically changes or alters the program transmitted via the broadcast network transmitter system 12 in response to audience responses received via the audience response system 16.

In one other embodiment, a program is stored in the broadcast control system 14. The audience response system 16 outputs a program change signal over the signal path 28 in response to audience responses which causes the broadcast control system to automatically change or alter the program stored therein in a predetermined manner in response to the received audience response signal. This changed or altered program then is outputted by the broadcast control system 14 over the signal path 18 for broadcast by the broadcast network transmitter system 12.

Figure 2:
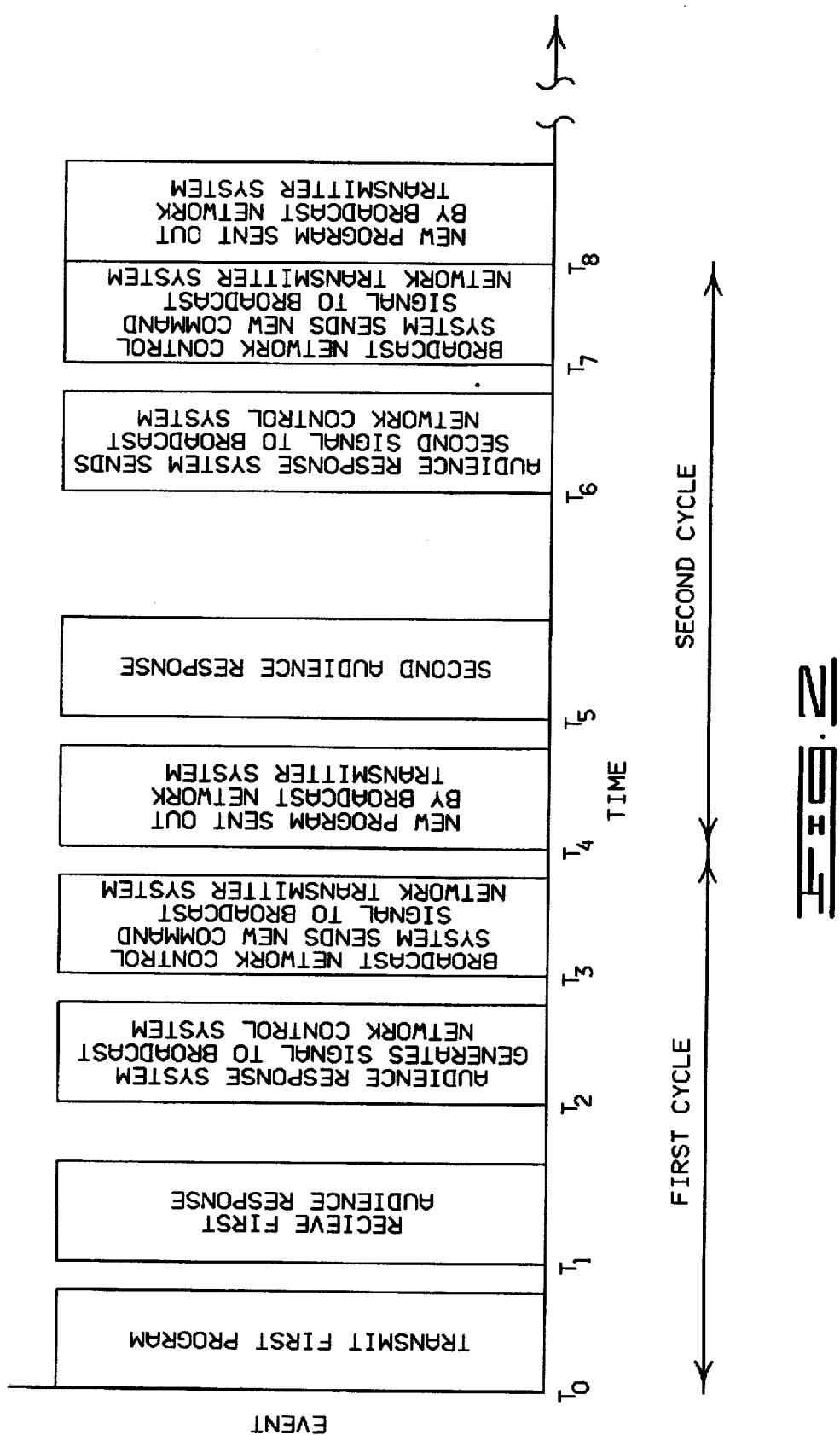
FIG. 2 is a diagrammatic view illustrating the time sequence for broadcasting programs and changing the broadcasted programs.

The time sequence just described is illustrated in FIG. 2. As shown in FIG. 2, the first program (selected program) is transmitted at a time $T_0$. The first program is received at a time $T_1$ by the audience. The audience then responds by providing audience response signals to the audience response system 16 which outputs the program change signal to the broadcast control system 14 at a time $T_2$. The broadcast network control system 14 then sends a new command signal or, in other words, outputs the new, altered or changed program to the broadcast network transmitter system 12 at a time $T_3$. The foregoing occurs during a first cycle of operation. The second cycle of operation is a repeat of the first cycle of operation, or in other words, the steps in the first cycle of operation are repeated to again alter the program transmitted by the broadcast transmitter system 12 in response to the audience responses received by the audience response system 16.

In another embodiment, a plurality of predetermined programs are stored in the broadcast network control system 14. Each of the predetermined programs is related to a same program subject matter, but each of the predetermined programs is different from the other predetermined programs in a preselected manner. Initially, the broadcast control system 14 selects one of the predetermined programs to be a selected program. The broadcast control system 14 then outputs the selected program over the signal path 18 for broadcasting via the broadcast network transmitter system 12.

The selected program is broadcasted via the broadcast network transmitter system 12 over the signal paths 20 and is received by the audience receiver units 22. The audience receiver units 22 output the selected program in a manner to be perceived by individuals comprising an audience. A plurality of individuals comprising the audience then use the audience response units 24 to output or broadcast an audience response to the selected program, the plurality of individuals being designated as responding individuals. The audience responses outputted by the audience response units 24 are received automatically by the audience response system 16 via the signal paths 26. The audience response system 16 analyzes the responses from the responding individuals and outputs a program change signal over the signal path 28 indicating a predetermined program change in response to the responses from the responding individuals.

The broadcast network control system 14 receives the program change signal and then selects automatically a predetermined program for each responding individual based on the response received from the responding individual with the selected predetermined programs being designated as a plurality of response derived programs. The plurality of response derived programs are then outputted by the broadcast network control system 14 over the signal path 18 to be broadcasted by the broadcast network transmitter system 12. The broadcast network transmitter system 12 then broadcasts independently each of the plurality of response derived programs over the signal paths 20 to be received by the audience receiver units 22 whereby each responding individual perceives the response derived program based on the response of the responding individual.

A plurality of individuals comprising the audience then use the audience response units 24 to output or broadcast another audience response to the audience response system 16 via the signal paths 26, the plurality of individuals being designated as responding individuals. The audience response system 16 analyzes the responses from the responding individuals and then outputs a program change signal over the signal path 28 to the broadcast network control system 14 indicating a predetermined program change in response to the responses from the responding individuals.

The broadcast network control system 14 receives the program change signal and then selects automatically a predetermined program for each responding individual based on the response received from the responding individual with the selected predetermined programs being designated as a plurality of response derived programs. The plurality of response derived programs are then outputted by the broadcast network control system 14 over the signal path 18 to be broadcasted by the broadcast network transmitter system 12.

The broadcast network transmitter system 12 then broadcasts independently each of the plurality of response derived programs over the signal paths 20 to be received by the audience receiver units 22 whereby each responding individual again perceives the response derived program based on the response of the responding individual.

This process is repeated for any one of a number of predetermined times. In short, the automated broadcast program change system 10 automatically changes or alters the programs being broadcasted via the broadcast network transmitter system 12 based on the responses of responding individuals received via the audience response system 16 so that each responding individual perceives a response derived program based on the response of the responding individual.

In another embodiment, a selected program is broadcasted via the broadcast network transmitter system 12 over the signal paths 20 and is received by the audience receiver units 22. The audience receiver units 22 output the selected program in a manner to be perceived by individuals comprising an audience. A plurality of individuals comprising the audience then use the audience response units 24 to output or broadcast an audience response to the selected program, the plurality of individuals being designated as responding individuals. The audience responses outputted by the audience response units 24 are received automatically by the audience response system 16 via the signal paths 26. The audience response system 16 analyzes the responses from the responding individuals and outputs a program change signal over the signal path 28 indicating a predetermined program change in response to the responses from the responding individuals.

The broadcast network control system 14 receives the program change signal and then selects automatically a predetermined program for each responding individual based on the response received from the responding individual with the selected predetermined programs being designated as a plurality of response derived programs. The plurality of response derived programs are then outputted by the broadcast network control system 14 over the signal path 18 to be broadcasted by the broadcast network transmitter system 12. The broadcast network transmitter system 12 then broadcasts independently each of the plurality of response derived programs over the signal paths 20 to be received by the audience receiver units 22 whereby each responding individual perceives the response derived program based on the response of the responding individual.

In yet another embodiment, a plurality of predetermined programs are stored in the broadcast network control system 14. Each of the predetermined programs is related to a same program subject matter, but each of the predetermined programs is different from the other predetermined programs in a preselected manner. Initially, the broadcast control system 14 selects one of the predetermined programs to be a selected program. The broadcast control system 14 then outputs the selected program over the signal path 18 for broadcasting via the broadcast network transmitter system 12.

The selected program is broadcasted via the broadcast network transmitter system 12 over the signal paths 20 and is received by the audience receiver units 22. The audience receiver units 22 output the selected program in a manner to be perceived by individuals comprising an audience. A plurality of individuals comprising the audience then use the audience response units 24 to output or broadcast an audience response to the selected program via the signal paths 26 to be received by the audience response system 16, the plurality of individuals being designated as responding individuals.

The audience response system 16 analyzes the responses from the responding individuals and outputs a program change signal over the signal path 28 indicating a predetermined program change based upon at least one response from the responding individuals.

The broadcast network control system 14 receives the program change signal and then selects automatically a predetermined program based upon at least one response from the responding individuals with the selected predetermined program being designated as a response derived program. The response derived program is then outputted by the broadcast network control system 14 over the signal path 18 to be broadcasted by the broadcast network transmitter system 12.

The broadcast network transmitter system 12 then broadcasts independently the response derived program over the signal paths 20 to some of the audience receiver units 22 whereby at least two of the individuals comprising the audience perceive distinct programs.

A plurality of individuals comprising the audience then use the audience response units 24 to output or broadcast another audience response to the audience response system 16 via the signal paths 26, the plurality of individuals being designated as responding individuals. Again, the audience response system 16 analyzes the responses from the responding individuals and outputs a program change signal over the signal path 28 to the broadcast network control system 14 indicating a predetermined program change based on at least one response from the responding individuals.

The broadcast network control system 14 receives the program change signal and then selects automatically a predetermined program based on at least one response from the responding individuals with the selected predetermined program being designated as a response derived program. The response derived program is then outputted by the broadcast network control system 14 over the signal path 18 to be broadcasted by the broadcast network transmitter system 12.

The broadcast network transmitter system 12 then broadcasts independently the response derived program over the signal paths 20 to some of the plurality of audience receiver units 22 whereby at least two of the individuals comprising the audience perceive distinct programs.

This process is repeated for any one of a number of predetermined times. In short, the automated broadcast program change system 10 automatically changes or alters the programs being broadcasted via the broadcast network transmitter system 12 based on at least one response from the responding individuals received via the audience response system 16 so that at least two of the individuals comprising the audience perceive distinct programs.

In another embodiment, a selected program is broadcasted via the broadcast network transmitter system 12 over the signal paths 20 and is received by the audience receiver units 22. The audience receiver units 22 output the selected program in a manner to be perceived by individuals comprising an audience. A plurality of individuals comprising the audience then use the audience response units 24 to output or broadcast an audience response to the selected program via the signal paths 26 to be received by the audience response system 16, the plurality of individuals being designated as responding individuals.

The audience response system 16 analyzes the responses from the responding individuals and outputs a program change signal over the signal path 28 indicating a predetermined program change based upon at least one response from the responding individuals.

The broadcast network control system 14 receives the program change signal and then selects automatically a predetermined program based upon at least one response from the responding individuals with the selected predetermined program being designated as a response derived program. The response derived program is then outputted by the broadcast network control system 14 over the signal path 18 to be broadcasted by the broadcast network transmitter system 12.

The broadcast network transmitter system 12 then broadcasts independently the response derived program over the signal paths 20 to some of the audience receiver units 22 whereby at least two of the individuals comprising the audience perceive distinct programs.

The broadcast network control system 14 is illustrated in greater detail in FIG. 3. The broadcast network control system 14 comprises a computer 30 such as an IBM model PS/2 with a modem 32. The modem 32 may be a unit such as ComTec Model X-TAL22BDI. The modem 32 receives signals from the audience response system 16 via the signal path 28 and outputs such responses over a signal path 34 to be received by the computer 30 or, more particularly, the receive computer program 36 portion of the computer 30. The receive computer program 36 may be a program such as used in the VM-3 of Tri Metro Company for example. Also, a program developed specifically to respond to the number and type of calls per minute can be obtained using the Lotus 1-2-3 software for example.

The receive program 36 of the broadcast network control system 14 is programmed to determine the change to be made in a change software program 38 portion of the computer 30. The change software program 38 sends the changed control information to the broadcast network transmitter system 12 using a modem unit 40 with such information being transmitted to the modem unit 40 via a control signal path 42. The modem 40 outputs the signal over the signal path 18.

The broadcast network transmitter system 14 is shown in greater detail in FIG. 4. The broadcast network transmitter system 14 comprises a program storage unit 50, a signal receiver unit 52 and a modulator/transmitter 54. The program storage unit 50 receives signals on a signal path 56 sent from the signal receiver unit 52 which may be a modem unit such as a ComTec Model X-TAL22BDI. A signal path 56 is accomplished using the standard bus lines in the IBM Model PS/2 computer unit. The program storage unit 50 may be a PS/2 computer unit for example connected to an SCI Podim Model 2000 which controls all of the tape, hard disk, and solid state storage units of the station or network. The program storage unit 50 selects the program or makes a predetermined change in the existing program to be broadcasted in the next sequence cycle. When the next sequence cycle starts, the new program is sent to the transmitter modulator 54a portion of the transmitter/modulator 54 via a signal path 56 which is a standard RG58 video line and standard audio table. The modulator 54a causes the broadcast transmitter 54b portion of the transmitter/modulator 54 to modulate at the maximum limits set by FCC regulations. The transmitter modulator 54 causes the program to be broadcast to the audience via the signal paths 20.

Figure 5:
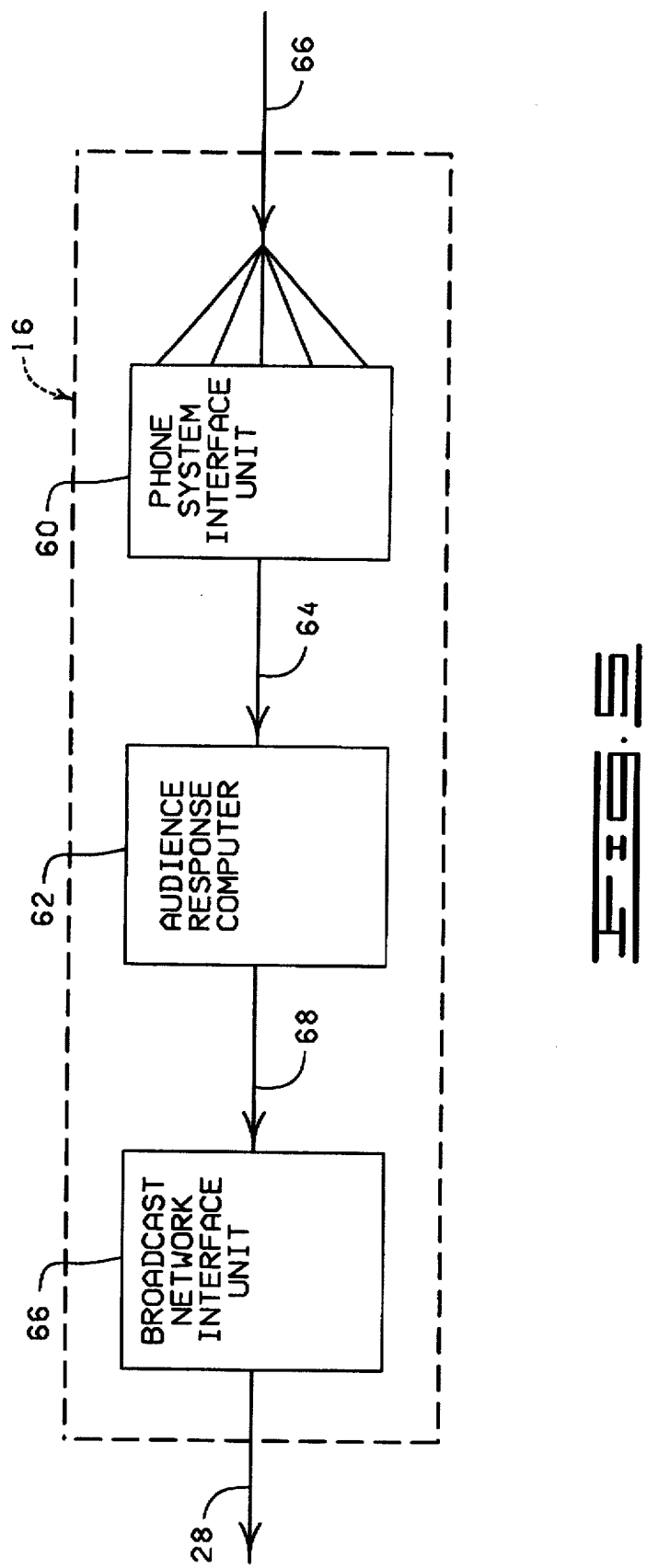
FIG. 5 is a schematic, diagrammatic view of an audience response system portion of the automated broadcast program change system of FIG. 1.

The audience response system 16 is shown in greater detail in FIG. 5. The audience response system 16 comprises a phone system interface unit 60 which is connected to an audience response computer 62 via a signal path 64 which in turn is connected to a broadcast network interface unit 66 via a signal path 68. The broadcast network interface unit 66 is connected to the broadcast network control system 14 via the signal path 28. The phone system interface unit 60 may be a Tri Metro Model VM-3 connected to the telephone network via the signal paths 66 for example. The phone system interface unit 60 is then connected to the audience response computer 62 via the signal path 64. The audience response computer 62 may be a computer such as IBM PS/2 Model 30 which operates a modem to accomplish the function of the broadcast network interface 66.

The audience response system 16 may be an automated system as described before. However, the audience response system 16 also may be operated by humans who receive the audience responses and output the signals over the signal path 28 by inputting information into the broadcast control network system 14 using a keyboard if desired. The audience response system 16 in the automated format includes an automatic answering machine such as those typically used to answer 1-900 and 1-800 incoming calls.

One example of the present system would be a commercial advertising a particular product at a particular price comprising the program. A plurality of similar commercials (all related to the same program subject matter) would be stored in the broadcast control system 14 with each program (commercial) having a different price associated with the product. When the commercial (program) is broadcasted at a particular price, the audience response might be that only a small number of the products are ordered and, in response thereto, the audience response system 16 would output a signal over the signal path 28 telling the broadcast network control system to select a different commercial (the same commercial but with a different price for the product) to be broadcasted by the system. Thus, the commercial automatically is changed in response to or based on audience responses. Other programming parameters may be changed in a similar manner. For example, product sizes may be altered based on audience responses, product colors may be altered based on audience responses, or product information may be altered based on audience responses.

Another example of the present invention would be a broadcasted menuing system which is personalized for each individual viewer in an audience. A plurality of similar menus (all related to the same program subject matter) would be stored in the broadcast control system 14 with each menu (program) having a predetermined set of menu items associated therewith. An initial menu (program) having an initial set of menu items associated therewith is selected by the broadcast network control system 14 and then outputted over the signal path 18 to be received by the broadcast network transmitter system 12.

The selected menu (program) is then broadcasted via the broadcast network transmitter system 12 and is received by a plurality of televisions (audience receiver units) to be perceived by individuals watching their televisions.

A plurality of individuals (responding individuals) select menu choices from the menu displayed on their television and these selections (responses) are received by the audience response system 16 via signal paths 26.

The audience response system 16 analyzes the selections (responses) from the responding individuals and outputs a program change signal over the signal path 28 indicating a predetermined menu (program) change in response to each response from the responding individuals.

The broadcast network control system 14 receives the program change signal and then selects a predetermined menu (program) change having a different set of menu items for each responding individual based on the response received from the responding individual. Each of the predetermined menu (program) changes is then outputted by the broadcast network control system 14 via signal path 18 to be received by the broadcast network transmitter system 12.

The broadcast network transmitter system 12 receives each of the predetermined menu (program) changes and then broadcasts independently each of the predetermined menu (program) changes so that each responding individual perceives the predetermined menu change based on the selections (responses) from the responding individual. In this manner, the broadcast program change system 10 personalizes the menu items to be broadcasted by the broadcasted menuing system for each individual viewer in the audience.

Other examples of the present system would be computer controlled multiple audience games, such as a chess tournament, having multiple simultaneous players. Furthermore, the present system may be used with private, educational or public service programs which are broadcasted via any suitable transmission link to be received by conventional radios and televisions.

Changes may be made in the steps or the sequence of steps of the methods described herein without departing from the spirit and the scope of the invention as defined in the following claims.

What is claimed is:

1. A method for automatically changing programs based on audience response, wherein the programs are broadcasted by a broadcast network transmitter system located at a broadcast network, comprising the steps of:
    (a) storing a plurality of predetermined programs at the broadcast network with each of the predetermined programs being related to a same program subject matter and each of the predetermined programs being different from the other predetermined programs in a preselected manner;
    (b) selecting one of the predetermined programs to be a selected program;
    (c) broadcasting via the broadcast network transmitter system the selected program for reception by a plurality of audience receiver units, the selected program to be perceived by at least one individual at each audience receiver unit, the individual at each audience receiver unit comprising an audience;
    (d) receiving automatically at the broadcast network a response from each of at least two of the audiences perceiving the selected program with the audiences being designated as the responding audiences;
    (e) selecting automatically a predetermined program for each responding audience based on the response received from the responding audience, the selected predetermined programs being designated as a plurality of response derived programs;
    (f) broadcasting independently each of the plurality of response derived programs via the broadcast network transmitter system such that each responding audience perceives a respective one of the response derived programs based on the response of the responding audience; and
    (g) repeating steps (d), (e) and (f).

2. A method for automatically changing programs based on audience response, wherein the programs are broadcasted by a broadcast network transmitter system located at a broadcast network, comprising the steps of:
    (a) storing a plurality of predetermined programs at the broadcast network with each of the predetermined programs being related to a same program subject matter and each of the predetermined programs being different from the other predetermined programs in a preselected manner;
    (b) selecting one of the predetermined programs to be a selected program;
    (c) broadcasting via the broadcast network transmitter system the selected program for reception by a plurality of audience receiver units, the selected program to be perceived by at least one individual at each audience receiver unit, the individual at each audience receiver unit comprising an audience;
    (d) receiving automatically at the broadcast network a response from each of at least two of the audiences perceiving the selected program with the audiences being designated as the responding audiences;
    (e) selecting automatically a predetermined program for each responding audience based on the response received from the responding audience, the selected predetermined programs being designated as a plurality of response derived programs;
    (f) broadcasting independently each of the plurality of response derived programs via the broadcast network transmitter system such that each responding audience perceives a respective one of the response derived programs based on the response of the responding audience.

3. A method for automatically changing programs based on audience response, wherein the programs are broadcasted by a broadcast network transmitter system located at a broadcast network, comprising the steps of:
    (a) storing a plurality of predetermined programs at the broadcast network with each of the predetermined programs being related to a same program subject matter and each of the predetermined programs being different from the other predetermined programs in a preselected manner;
    (b) selecting one of the predetermined programs to be a selected program;
    (c) broadcasting via the broadcast network transmitter system the selected program for reception by a plurality of audience receiver units, the selected program to be perceived by at least one individual at each audience receiver unit, the individual at each receiver unit comprising an audience;
    (d) receiving automatically at the broadcast network a response from each of at least two audiences perceiving the selected program with the audiences being designated as the responding audiences;
    (e) selecting automatically a different predetermined program based on at least one response from each of the responding audiences, the different predetermined program being designated as a response derived program;
    (f) broadcasting the response derived program via the broadcast network transmitter system to some of the audience receiver units such that at least two of the audiences perceive distinct programs; and
    (g) repeating steps (d), (e) and (f).

4. A method for automatically changing programs based on audience response, wherein the programs are broadcasted by a broadcast network transmitter system located at a broadcast network, comprising the steps of:
    (a) storing a plurality of predetermined programs at the broadcast network with each of the predetermined programs being related to a same program subject matter and each of the predetermined programs being different from the other predetermined programs in a preselected manner;
    (b) selecting one of the predetermined programs to be a selected program;
    (c) broadcasting via the broadcast network transmitter system the selected program for reception by a plurality of audience receiver units, the selected program to be perceived by at least one individual at each audience receiver unit, the individual at each receiver unit comprising an audience;
    (d) receiving automatically at the broadcast network a response from each of at least two audiences perceiving the selected program with the audiences being designated as the responding audiences;
    (e) selecting automatically different predetermined programs based on at least one response from each of the responding audiences, the different predetermined programs being designated as response derived programs;

(f) broadcasting independently the response derived programs via the broadcast network transmitter system to some of the audience receiver units such that at least two of the audiences perceive distinct programs.

* * * * *

UNITED STATES PATENT AND TRADEMARK OFFICE
CERTIFICATE OF CORRECTION

PATENT NO.    :   5,694,162                           Page 1 of 2

DATED         :   December 2, 1997

INVENTOR(S)   :   Charles C. Freeny, Jr.

It is certified that error appears in the above-identified patent and that said Letters Patent is hereby corrected as shown below:

In the drawings, Figure 4, please delete drawing element numeral "56" and insert --58-- and delete drawing element numeral "125" and insert --18-- as indicated below.

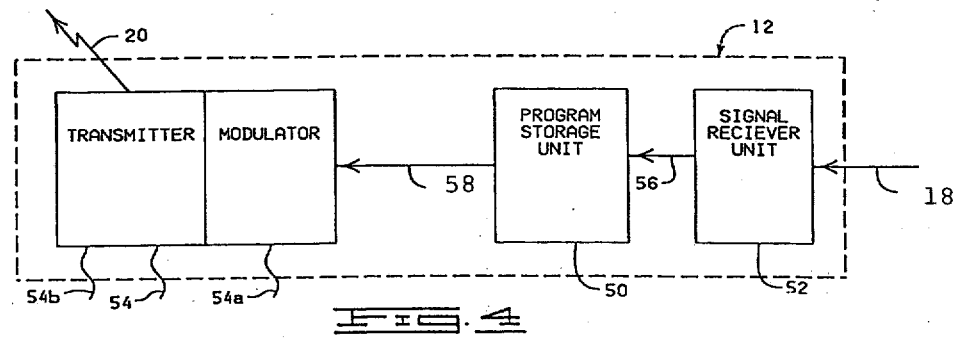

UNITED STATES PATENT AND TRADEMARK OFFICE
CERTIFICATE OF CORRECTION

PATENT NO.    :    5,694,162

DATED         :    December 2, 1997

INVENTOR(S)   :    Charles C. Freeny, Jr.

It is certified that error appears in the above-identified patent and that said Letters Patent is hereby corrected as shown below:

Column 7, line 30, please delete "A" and substitute therefor --The--.

Column 7, line 41, please delete "56" and substitute therefor --58--.

Signed and Sealed this

Sixteenth Day of June, 1998

Attest:

BRUCE LEHMAN

*Attesting Officer*    *Commissioner of Patents and Trademarks*